US010215931B1

(12) United States Patent
He

(10) Patent No.: US 10,215,931 B1
(45) Date of Patent: Feb. 26, 2019

(54) OPTICAL FIBER CONNECTOR HAVING A SLIDABLE OUTER ENCLOSURE AND A HANDLE

(71) Applicant: HYC Co., Ltd., Guangdong (CN)

(72) Inventor: Yong He, Guangdong (CN)

(73) Assignee: HYC Co., Ltd., Guangdong (CN)

( * ) Notice: Subject to any disclaimer, the term of this patent is extended or adjusted under 35 U.S.C. 154(b) by 0 days.

(21) Appl. No.: 15/988,181

(22) Filed: May 24, 2018

(30) Foreign Application Priority Data

Oct. 26, 2017 (CN) .................... 2017 2 1394556 U

(51) Int. Cl.
   *G02B 6/38* (2006.01)
   *G02B 6/42* (2006.01)

(52) U.S. Cl.
   CPC ........... *G02B 6/387* (2013.01); *G02B 6/3873* (2013.01); *G02B 6/3893* (2013.01); *G02B 6/4261* (2013.01); *G02B 6/4292* (2013.01)

(58) Field of Classification Search
   CPC .... G02B 6/387; G02B 6/3873; G02B 6/3893; G02B 6/4261; G02B 6/4292
   See application file for complete search history.

(56) References Cited

U.S. PATENT DOCUMENTS

| 9,568,689 B2* | 2/2017 | Nguyen | G02B 6/389 |
| 9,739,955 B2* | 8/2017 | Lee | G02B 6/3893 |
| 2006/0029332 A1* | 2/2006 | Chiu | G02B 6/3893 |
| | | | 385/53 |

* cited by examiner

*Primary Examiner* — Akm E Ullah
(74) *Attorney, Agent, or Firm* — Andrus Intellectual Property Law, LLP

(57) ABSTRACT

Provided is an optical fiber connector including a connector body, an outer enclosure and a handle. The connector body is provided with a head and a first sliding slot. The outer enclosure is configured to enclose the connector body and to be slidable along the connector body. The handle includes a holding portion and a hooking portion. The hooking portion extends forward from the holding portion, and is slidable along the first sliding slot. The connector body and the handle are each provided with a abutting portion. When the handle moves forward along the first sliding slot, the handle abuts against the connector body through the abutting portions to push the connector body forward. When the handle moves backward along the first sliding slot, the hooking portion is hooked onto the outer enclosure to pull the outer enclosure backward.

10 Claims, 3 Drawing Sheets

OPTICAL FIBER CONNECTOR HAVING A SLIDABLE OUTER ENCLOSURE AND A HANDLE

CROSS-REFERENCES TO RELATED APPLICATIONS

This application claims priority to Chinese patent application No. CN201721394556.9, filed on Oct. 26, 2017, the disclosure of which is incorporated herein by reference in its entirety.

TECHNICAL FIELD

The present disclosure relates to technologies for optical fiber equipment and, in particular, to an optical fiber connector.

BACKGROUND

It is a basic requirement for an optical fiber connector, a device used for detachable (movable) connection between optical fibers, to precisely connect two end faces of the optical fibers so as to maximally couple light energy outputted by a transmitting optical fiber to a receiving optical fiber and minimize an impact on a system due to involvement of the optical fiber connector in an optical link. To a certain extent, the optical fiber connector affects the reliability and performance of an optical transmission system.

Optical fiber connectors are divided into many types according to connection structures. Some optical fiber connectors have a connector body and an outer enclosure. One end of the connector body is provided with a head connected to an adapter and the other end of the connector body is connected to an optical fiber connection wire. In use, the connector body is locked into the adapter when inserted into the adapter to prevent the connector body from coming off the adapter. In this case, the optical fiber and the optical fiber connector are connected by the head. The outer enclosure encloses the outside of the connector body. When the outer enclosure is pulled outward, the connector body can be unlocked from the adapter.

When optical fiber connectors are densely arranged on the adapter, the optical fiber connectors are close to each other, so it is not easy for fingers to pull the outer enclosure. To make it easy to pull the outer enclosure, some optical fiber connectors are equipped with a handle. The rear end of the handle is slidably connected to the outside of the connector body by sheathing the connector body. The front end of the handle is hooked onto the outer enclosure by way of fastening. When pulled backward, the handle can pull the outer enclosure so as to unlock the connector body from the adapter. By such configuration, the handle is disposed outside the connector body by sheathing the connector body, so the handle is stable and has reliable performance when moved, but the handle has a large size and thus increases the overall dimension of the connector body.

SUMMARY

An object of the present disclosure is to provide an optical fiber connector that has a simple-structured and small-sized handle.

To achieve this object, the present disclosure provides the solution described below.

An optical fiber connector includes: a connector body, a connector body, and a handle.

The connector body is provided with a head configured to be connected to other components and a first sliding slot is disposed outside the connector body.

The outer enclosure is configured to enclose the connector body and is slidable along the connector body.

The handle includes a holding portion and a hooking portion. The hooking portion extends forward from the holding portion and is slidable along the first sliding slot.

The connector body and the handle are each provided with a abutting portion. When the handle moves forward along the first sliding slot, the handle abuts against the connector body through the abutting portions to push the connector body forward.

When the handle moves backward along the first sliding slot, the hooking portion is hookable onto the outer enclosure to pull the outer enclosure backward.

Optionally, the connector body includes an inner enclosure, a tail enclosure and a tail sleeve sequentially connected, the head is disposed on the inner enclosure, the tail sleeve is configured for an optical fiber connecting wire to pass through, the tail enclosure protrudes from the inner enclosure, and the first sliding slot is a through hole opened in the tail enclosure.

Optionally, the hooking portion includes a resilient arm extending forward from the holding portion and a hook protruding from the resilient arm, the resilient arm is slidable along the first sliding slot, and the hook is hookable onto the outer enclosure.

Optionally, the outer enclosure is provided with a second sliding slot in a same direction as the first sliding slot, a stopping arm is disposed at the second sliding slot, and the hook is hooked onto the stopping arm through resilience of the resilient arm after the hook passes through the second sliding slot.

Optionally, the stopping arm is located at a rear end of the second sliding slot and is connected to two sides of the second sliding slot.

Optionally, the hook is provided with a guiding portion for guiding the hook into the second sliding slot, and the guiding portion is inclined to an extending direction of the second sliding slot.

Optionally, a protrusion portion is formed at a position of the resilient arm next to the holding portion, and the first sliding slot is provided with a recess portion tightly fitting the protrusion portion.

Optionally, at least two side-by-side hooking portions are disposed at a front end of the holding portion.

Optionally, the hooking portion extends forward from an end face of the holding portion, and the end face of the holding portion abuts against a rear end face of the tail enclosure when the handle slides forward along the first sliding slot.

Optionally, the handle is a plate structure.

The beneficial effects of the present disclosure are set forth below. The present disclosure provides an optical fiber connector including a connector body, an outer enclosure and a handle. The connector body is provided with a head connected to another component. A first sliding slot is disposed outside the connector body. The outer enclosure is configured to enclose the connector body and is slidable along the connector body. The handle includes a holding portion and a hooking portion. The hooking portion extends forward from the holding portion. The hooking portion is slidable along the first sliding slot. The connector body and the handle are each provided with a abutting portion. The abutting portion of the connector body and the abutting portion of the handle are abuttable against each other. When the handle moves forward along the first sliding slot, the handle abuts against the connector body through the abutting portions to push the connector body forward. When the handle moves backward along the first sliding slot, the hooking portion is hookable onto the outer enclosure to pull the outer enclosure backward. The handle provided by the present disclosure can push the connector body forward by using the abutting portion so as to lock the connector body into the adapter, and can also use the hooking portion to pull the outer enclosure backward so as to unlock the connector body from the adapter. Compared with an existing configuration in which the handle sheathes the connector body, the handle of the present disclosure slidably engages with the first sliding slot and does not need to sheathe the connector body from outside, simplifying the structure of the handle, reducing the size of the handle, reducing the manufacturing costs of the handle, reducing the overall dimension of the optical fiber connector and ensuring reliable connection between the handle and the connector body.

DETAILED DISCLOSURE

To make the solved problem, adopted solution and achieved effects of the present disclosure clearer, the present disclosure is further described in conjunction with embodiments and accompanying drawings.

Embodiment 1

Figure 1:
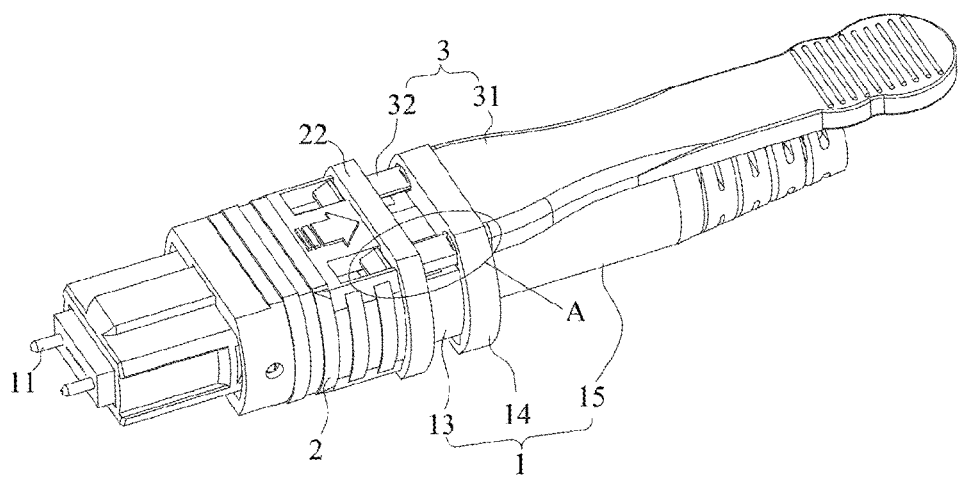
FIG. 1 is a schematic structural view of an optical fiber connector provided by the present disclosure.
Figure 2:
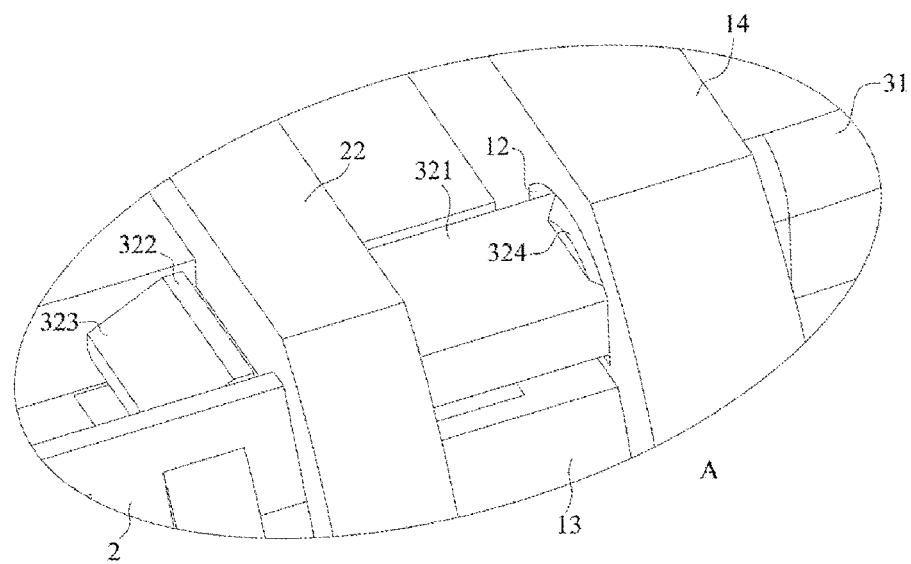
FIG. 2 is a partial enlarged view of a part A of FIG. 1.
Figure 3:
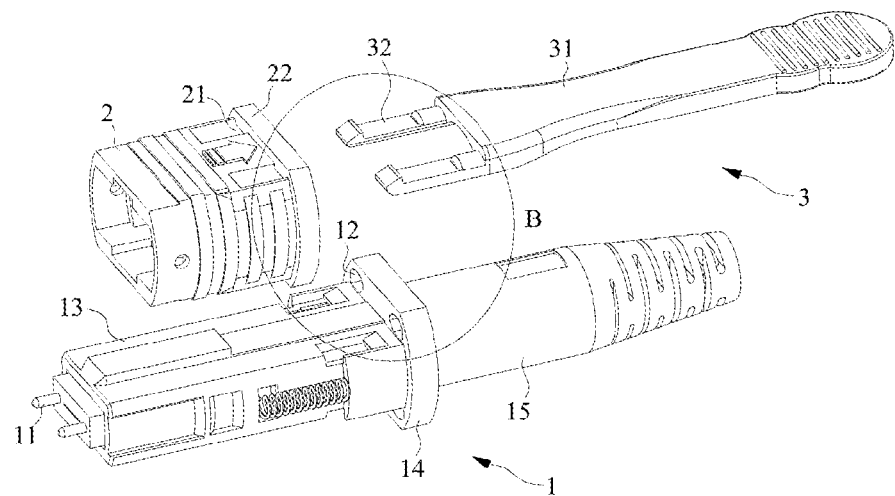
FIG. 3 is an exploded view of an optical fiber connector provided by the present disclosure.

As shown in FIGS. 1 to 6, this embodiment provides an optical fiber connector in an optical fiber communication device. As shown in FIG. 3, the optical fiber connector includes a connector body 1, an outer enclosure 2 and a handle 3. The connector body 1 can be connected to and locked into an adapter. The connector body 1 is provided with a head 11 configured to be connected to another optical fiber connector. After the connector body 1 is inserted into the adapter, heads 11 on the connector bodies 1 at two ends of the adapter are precisely connected to each other through a sleeve in the adapter. The connector body 1 includes an inner enclosure 13, a tail enclosure 14 and a tail sleeve 15 sequentially connected. The head 11 is disposed on the inner enclosure 13. The tail sleeve 15 is configured for an optical fiber connecting wire to pass through. The tail enclosure 14 protrudes from the inner enclosure 13. The outer enclosure 2 is configured to enclose the connector body 1 and to be slidable along the connector body 1. When the outer enclosure 2 slides outward, the connector body 1 can be unlocked from and pulled out of the adapter. The handle 3 includes a holding portion 31 and a hooking portion 32. The hooking portion 32 extends forward from the holding portion 31. The holding portion 31 makes it easy to push and pull the handle 3. The holding portion 31 is provided with an anti-skid pattern.

In this embodiment, a first sliding slot 12 is disposed outside the connector body 1. Here, the first sliding slot 12 is a through hole and the first sliding slot 12 is a through hole opened on the tail enclosure 14. The hooking portion 32 passes through the first sliding slot 12 and slides along the first sliding slot 12. Cooperation between the hooking portion 32 and the first sliding slot 12 ensures reliability of sliding and connection between the handle 3 and the connector body 1. The connector body 1 and the handle 3 are each provided with a abutting portion. When the handle 3 moves forward along the first sliding slot 12, the handle 3 abuts against the connector body 1 through the abutting portions to push the connector body 1 forward. In this embodiment, the hooking portion 32 extends forward from an end face of the holding portion 31, and the end face of the holding portion 31 and a rear end face of the tail enclosure 14 are each provided with a abutting portion. When the handle 3 slides forward along the first sliding slot 12, the end face of the holding portion 31 abuts against the rear end face of the tail enclosure 14. In this embodiment, on the basis of an arrangement direction of the tail sleeve 15, the tail enclosure 14 and the inner enclosure 13, the direction from the tail sleeve 15 to the inner enclosure 13 is the forward direction and the direction from the inner enclosure 13 to the tail sleeve 15 is the backward direction.

When the handle 3 moves backward along the first sliding slot 12, the hooking portion 32 is hookable onto the outer enclosure 2 to pull the outer enclosure 2 backward.

The handle 3 in this embodiment pushes the connector body 1 forward by the abutting portions, facilitating insertion of the connector body 1 into the adapter. Hooking of the hooking portion 32 onto the outer enclosure 2 allows the handle 3 to pull the outer enclosure 2 backward to unlock the connector body 1 from the adapter. Compared with the related art in which a handle is disposed outside a connector body 1 by sheathing the connector body, the handle in this embodiment no longer needs to wrap the connector body 1 from outside. The handle 3 is slidably connected to the connector body 3 reliably just by making the first sliding slot 12 to cooperate with the hooking portion 32 and making the hooking portion 32 to pass through the first sliding slot 12, simplifying the structure of the handle 3, reducing the manufacturing costs of the handle 3 and reducing the overall dimension of the optical fiber connector.

Due to the use of a structure in which the first sliding slot 12 cooperates with the hooking portion 32, the handle 3 no longer needs to wrap the connector body 1 from outside. Thus, the handle 3 can be a plate structure. The flat design of the plate structure simplifies the structure of the handle 3, reduces the manufacturing costs of the handle 3. Additionally, the structural strength of the plate structure is high.

In this embodiment, the tail enclosure 14 protrudes from the inner enclosure 13 and the first sliding slot 12 is a through hole on the tail enclosure 14. Such structure makes it easy to limit the position of the hooking portion 32 and ensures stability of the connection between the handle 3 and the connector body 1. Such structure involves a small modification with respect to the original connector body. The first sliding slot 12 can be disposed on the tail enclosure 14 or disposed on the inner enclosure 13 or the tail sleeve 15, as long as the hooking portion 32 can reliably slide along the first sliding slot 12 so as to make the handle 3 to be slidably connected to the connector body 1 reliably.

In this embodiment, the holding portion 31 passes through the first sliding slot 12 disposed on the tail enclosure 14, so simply by making the end face of the holding portion 31 abut against the rear end face of the tail enclosure 14, it is possible to push the connector body 1 forward, not requiring additional abutting portions and thus simplifying the overall structure and ensuring user-friendliness. Of course, additional abutting portions may be disposed on the connector body 1 and the handle 3. For example, a first abutting portion may protrude from a surface of the holding portion 31 next to the connector body 1, and a second abutting portion may be disposed on the tail sleeve 15 or the tail enclosure 14. The first abutting portion and the second abutting portion may abut against each other. Alternatively, abutting portions abutting against each other may be disposed on the hooking portion 32 and the inner enclosure 13. In short, it is feasible as along as the abutting portions can be used to push the connector body 1 forward when the handle 3 is pushed forward.

Figure 4:
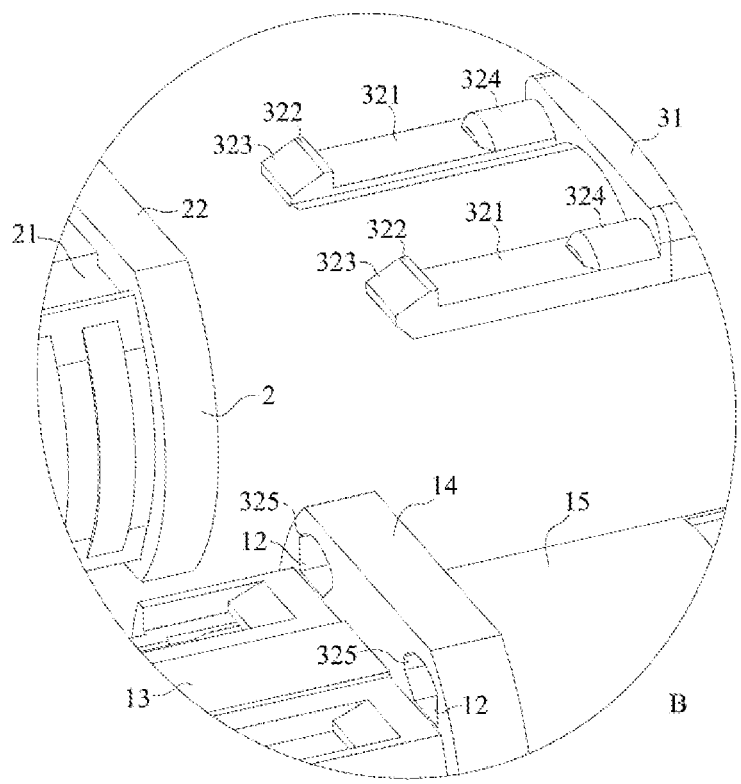
FIG. 4 is a partial enlarged view of a part B of FIG. 3.
Figure 5:
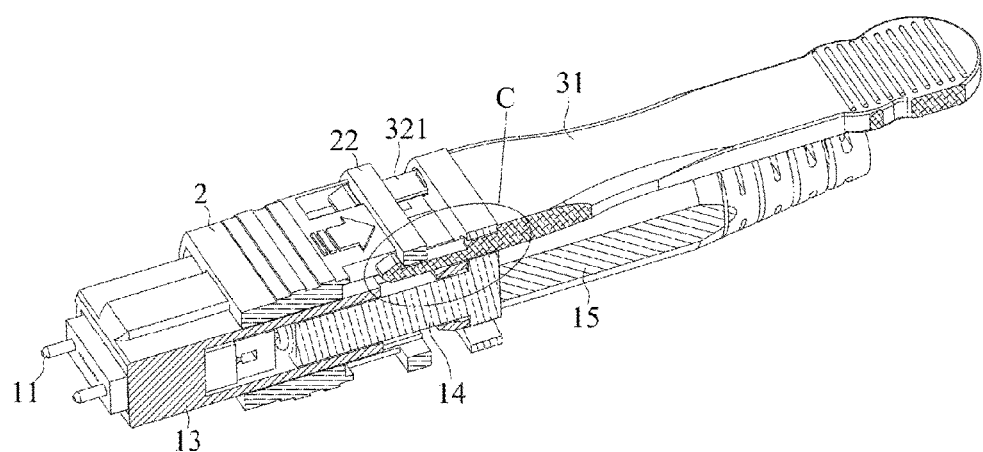
FIG. 5 is a sectional view of an optical fiber connector provided by the present disclosure.
Figure 6:
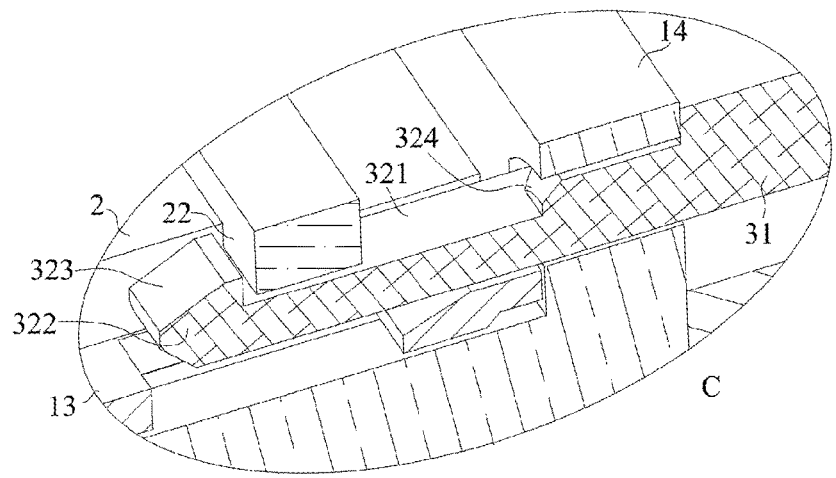
FIG. 6 is a partial enlarged view of a part C of FIG. 5.
In the accompanying drawings:
1—connector body, 11—head, 12—first sliding slot, 13—inner enclosure, 14—tail enclosure, 15—tail sleeve, 2—outer enclosure, 21—second sliding slot, 22—stopping arm, 3—handle, 31—holding portion, 32—hooking portion, 321—resilient arm, 322—hook, 323—guiding portion, 324—protrusion portion, 325—recess portion

As shown in FIG. 4, in this embodiment, the hooking portion 32 includes a resilient arm 321 extending forward from the holding portion 31 and a hook 322 protruding from the resilient arm 321. The resilient arm 321 is slidable along the first sliding slot 12, and the hook 322 is hookable onto the outer enclosure 2 to pull the outer enclosure 2 backward. Bending of the resilient arm 321 allows the hook 322 to enter a hooking area of the outer enclosure 2. Resilience of the resilient arm 321 allows the hook 322 to be reliably hooked onto the outer enclosure 2.

To prevent the hook 322 from coming off the outer enclosure 2, a protrusion portion 324 is formed at a position of the resilient arm 321 next to the holding portion 31, and the first sliding slot 12 is provided with a recess portion 325 tightly fitting the protrusion portion 324. The protrusion portion 324 not only improves the structural strength of an area of the resilient arm 321 next to the holding portion 31 and improves rigidity of the resilient arm 321, but also tightly fits the recess portion 325 to prevent the resilient arm 321 from shaking in the first sliding slot 12. All these improve reliable hooking of the hook 322. The protrusion portion 324 is disposed next to the holding portion 31 to avoid the impact when a front end of the resilient arm 321 slides.

To facilitate hooking of the hook 322, the outer enclosure 2 is provided with a second sliding slot 21 extending in a same direction as the first sliding slot 12, a stopping arm 22 is disposed at the second sliding slot 21, and the hook 322 is hooked onto the stopping arm 22 through resilience of the resilient arm 321 after the hook 322 passes through the second sliding slot 21. A barb-like structure is formed by the stopping arm 22 and the hook 322. The resilient arm 321 ensures that the hook 322 is reliably hooked onto an end face of the stopping arm 22. The second sliding slot 21 can further limit the position of the resilient arm 321 to ensure that the resilient arm 321 and the hook 322 slide along the second sliding slot 21 and are accurately hooked onto the stopping arm 22. The second sliding slot 21 cooperates with the first sliding slot 12 to further limit the position of the handle 3 that is sliding so as to ensure that the handle 3 slides in a predetermined direction.

In this embodiment, the stopping arm 22 is located at a rear end of the second sliding slot 21 and is connected to two sides of the second sliding slot 21 to enhance the structural strength of the stopping arm 22. In one or more embodiment, the stopping arm 22 is formed by protruding from one side of the second sliding slot 21. Such stopping arm needs to have a high strength to avoid being damaged when pulled.

To make it easy for the hook 322 to enter the second sliding slot 21 and well avoid the stopping arm 22, the hook 322 is provided with a guiding portion 323 for guiding the hook 322 into the second sliding slot 21, and the guiding portion 323 is inclined to an extending direction of the second sliding slot 21.

In this embodiment, two side-by-side hooking portions 32 are disposed at a front end of the holding portion 31 to pull the outer enclosure 2 from two sides, so each hooking portion 32 bears a reduced tensile force, balancing the force on two sides of the outer enclosure 2. Of course, the number of the hooking portions 32 can be set according to actual needs. For example, additional hooking portions can be disposed on the opposite side.

The above are merely embodiments of the present disclosure. Those of ordinary skill in the art will make modifications in the embodiments and application scope according to the present disclosure. The content of this specification is not to be construed as limiting the present disclosure.

The invention claimed is:

1. An optical fiber connector, comprising:
   a connector body, which is provided with a head and a first sliding slot;
   an outer enclosure, which is configured to enclose the connector body and to be slidable along the connector body; and
   a handle, which comprises a holding portion and a hooking portion, wherein the hooking portion extends forward from the holding portion and the hooking portion is slidable along the first sliding slot,
   wherein the connector body and the handle are each provided with a abutting portion, and when the handle moves forward along the first sliding slot, the abutting portion of the handle abuts against the abutting portion of the connector body to push the connector body forward; and wherein when the handle moves backward along the first sliding slot, the hooking portion is hooked onto the outer enclosure to pull the outer enclosure backward.

2. The optical fiber connector of claim 1, wherein the connector body comprises an inner enclosure, a tail enclosure and a tail sleeve sequentially connected, the head is disposed on the inner enclosure, the tail enclosure protrudes from the inner enclosure, and the first sliding slot is a through hole in the tail enclosure.

3. The optical fiber connector of claim 2, wherein the hooking portion comprises a resilient arm extending forward from the holding portion and a hook protruding from the resilient arm, the resilient arm is slidable along the first sliding slot, and the hook is hookable onto the outer enclosure.

4. The optical fiber connector of claim 3, wherein the outer enclosure is provided with a second sliding slot extending in a same direction as the first sliding slot, a stopping arm is disposed at the second sliding slot, and the hook is hooked onto the stopping arm through resilience of the resilient arm after the hook passes through the second sliding slot.

5. The optical fiber connector of claim 4, wherein the stopping arm is located at a rear end of the second sliding slot and is connected to two sidewalls of the second sliding slot.

6. The optical fiber connector of claim 4, wherein the hook is provided with a guiding portion for guiding the hook into the second sliding slot, and the guiding portion is inclined to an extending direction of the second sliding slot.

7. The optical fiber connector of claim 3, wherein a protrusion portion is formed at a position of the resilient arm next to the holding portion, and the first sliding slot is provided with a recess portion tightly fitting the protrusion portion.

8. The optical fiber connector of claim 1, wherein at least two side-by-side hooking portions are disposed at a front end of the holding portion.

9. The optical fiber connector of claim 2, wherein the hooking portion extends forward from an end face of the holding portion, and the end face of the holding portion abuts against a rear end face of the tail enclosure when the handle slides forward along the first sliding slot.

10. The optical fiber connector of claim 1, wherein the handle is a plate structure.

\* \* \* \* \*